United States Patent [19]

Clairouin et al.

[11] Patent Number: 5,009,918
[45] Date of Patent: Apr. 23, 1991

[54] REFORMED FISH PRODUCTS

[75] Inventors: Noël Clairouin, Condette; Alain Gueroult, Lamartine, both of France; Remi Lemoyne, Vevey, Switzerland

[73] Assignee: Nestec S.A., Vevey, Switzerland

[21] Appl. No.: 516,052

[22] Filed: Apr. 27, 1990

Related U.S. Application Data

[62] Division of Ser. No. 399,817, Aug. 29, 1989, Pat. No. 4,948,620.

[30] Foreign Application Priority Data

Sep. 14, 1988 [EP] European Pat. Off. ........ 88114994.2

[51] Int. Cl.⁵ .................................... A23L 1/325
[52] U.S. Cl. .................................... 426/643; 426/92; 426/129
[58] Field of Search ............... 426/105, 129, 135, 643, 426/410, 413, 414, 513, 89, 92

[56] References Cited

U.S. PATENT DOCUMENTS

| 2,093,069 | 9/1937 | Bedford | 426/643 X |
| 2,827,383 | 3/1958 | Gorton | 426/643 X |
| 2,851,367 | 9/1958 | Heen | 426/513 |
| 3,718,481 | 2/1973 | Joaquin | 426/643 X |
| 4,474,823 | 10/1984 | Nishikawa et al. | 426/643 |
| 4,728,521 | 3/1988 | Mitchell | 426/129 X |

FOREIGN PATENT DOCUMENTS

| 2544177 | 10/1984 | France | 426/105 |
| 58-19264 | 4/1983 | Japan | 426/643 |
| 58-98058 | 6/1983 | Japan | 426/129 |
| 61-1366 | 1/1986 | Japan | 426/105 |

Primary Examiner—Arthur L. Corbin
Attorney, Agent, or Firm—Vogt & O'Donnell

[57] ABSTRACT

A reformed fish product is provided in the form of a sausage which has boned skinless fish fillets encompassed by fish fillets with skin. When sliced, the sausage resembles a natural fish steak with an outer skin, but without the bones.

6 Claims, 2 Drawing Sheets

REFORMED FISH PRODUCTS

CROSS REFERENCE TO RELATED APPLICATIONS

This is a divisional application of application Ser. No. 07/339,817, filed on Aug. 29, 1989, now U.S. Pat. No. 4,948,620.

BACKGROUND OF THE INVENTION

This invention relates to the shaping of fish.

It is known, for example from FR-A-1 595 605, that a fish loaf can be produced by moulding skinless fish fillets in a cylindrical mould followed by freezing. A loaf such as this may then be cut into slices.

In another process described, for example, in FR-A-1 472 494 and FR-A-2 106 170, the skinless fillets are placed in an envelope and then frozen. In these processes, cohesion between the fillets is guaranteed by the presence of a binder applied to the fillets before shaping or by agglutination of the fillets to one another by salting before shaping and smoking after shaping.

SUMMARY OF THE INVENTION

It has now been found that, starting from raw fish fillets, it is possible to shape a product which, when cut into slices, resembles natural fish steaks with the skin, but without the bones.

According to the invention, the cohesion of the slices does not require the presence of a binder or salting and smoking operations, as in known processes. However, these means are compatible with the present invention as is the addition of other texturing agents.

Accordingly, the present invention relates to a reformed fish product in the form of a sausage having a plurality of boned skinless fish fillets encompassed by a plurality of boned fish fillets with skin such that the skin of the fillets with skin forms substantially all of the exterior surface of the product. The present invention also relates to a process for the production of a reformed fish product consisting of fish skin on the outside and of boneless fish flesh on the inside, characterized in that raw fillets are placed and then compressed in a casing closed beforehand at one end so that fillets with skin cover substantially the entire inner surface of the casing with the skin on the outside and skinless fillets occupy the central space of the casing, in that the open end of the casing is closed and the filled casing is frozen.

DETAILED DESCRIPTION OF THE INVENTION

According to the invention, the fish intended for the preparation of reformed products is in the form of fillets. In the context of the invention, fillets are understood to be not only whole fillets, but also pieces of fillets or strips of raw fish of appropriate size. To obtain products of the best quality, it is preferable to remove the blood-soiled parts and other parts which have undergone a change in colour.

As mentioned above, certain fillets which form the outside of the reformed product have had to be taken from the raw fish without skinning and are thus completely covered with skin. The fillets with skin may be trimmed by a straight oblique cut of the part nearest the base of the head or by a V cut which enables the large side bones to be removed while leaving the front end of the sides intact. An outside fillet advantageously weighs 250 to 350 g.

By contrast, other fillets which are situated at the centre of the reformed product have had to be removed and skinned so that there is no longer any skin. Advantageously, they also comprise the front end of the sides resulting from a V cut. The centre fillets are preferably smaller than the outside fillets of the reformed product and one centre fillet represents 15 to 55% by weight of an outside fillet, i.e., weighs about 50 to 150 g.

The invention seeks to obtain a fish "sausage" of which the outer surface is completely covered with skin. It has been found that this result is obtained when the outside fillets preferably represent 35 to 55% by weight of the centre fillets.

According to the invention, a casing is filled with fillets, for example by means of a filling machine of the type used by pork butchers and the ends of the casing are closed to form a sausage. To this end, it is possible to use either a natural animal casing or an envelope of a flexible and strong, food-quality plastics material. The role of the casing is to hold the sausage in shape during freezing.

It is possible to use any of the various types of fish which are normally presented in the form of slices or steaks, including for example codfish, cod, haddock and salmon.

The sausages are then frozen and may be stored for subsequent use or may be treated to make prepared dishes. In the latter case, the loaf is removed from its casing, for example by immersing the sausage in hot water and then cutting it longitudinally by means of a cutting tool. The loaf thus released is then sawed transversely into steaks which are packed individually in bags, preferably of an air-tight material, preferably in vacuo. The steaks may advantageously be surface-glazed, for example by spraying on water. Glazing avoids exudation of water and juice. Alternatively, a water-retaining agent, for example a polyphosphate, may be added to the fillets. A sauce is preferably added to the bag before it is hermetically sealed.

The invention is illustrated by the following Examples in conjunction with the accompanying drawings. In the Examples, parts and percentages are by weight, unless otherwise stated.

DETAILED DESCRIPTION OF THE DRAWINGS AND EXAMPLES

EXAMPLE 1

Figure 1A:
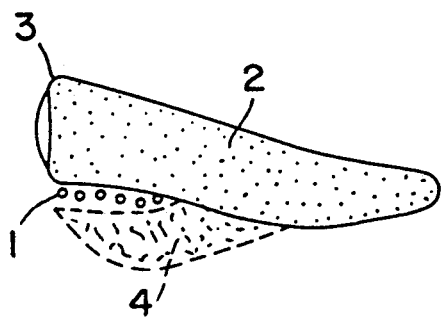
FIG. 1 illustrates the cutting of the fillets for use in the present invention.

The large side bones 1 are eliminated from fresh raw cod fillets 2 removed with their skin 3 by an oblique cut which also removes the front part of the sides 4, as shown in FIG. 1a. These fillets weigh on average 280 g for a length of 40 cm or 320 g for a length of 45 cm.

Figure 1B:
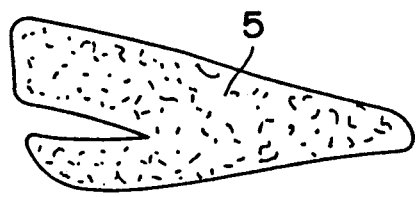

Skinless fillets 5 weighing on average 100 g are prepared from small cod by filleting, V cutting and skinning as shown in FIG. 1b. The preparation of the sausages is diagrammatically illustrated in FIG. 2.

Figures 2A, 2B, 2C:
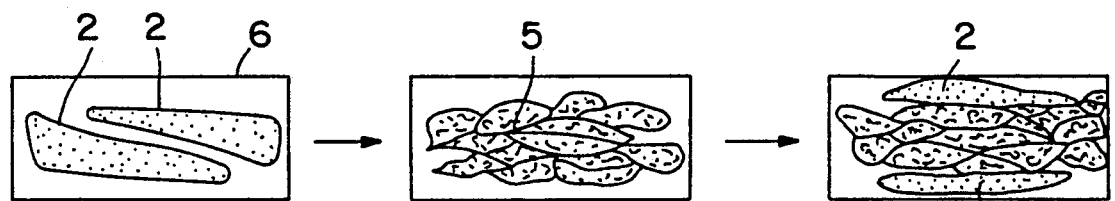
FIG. 2 diagrammatically illustrates one embodiment of the process of the present invention.

Two fillets with skin 2 are then placed at the bottom of the cylindrical moulding chamber 6 of a ham filling machine with a retractable nozzle, the chamber having a length of 500 mm and a diameter of 90 mm, with the skin 3 facing outwards in such a way that the two fish face the ends of the chamber 6 without overlapping (FIG. 2a).

The chamber is then packed at its centre with 1.5 kg small skinless fillets 5 so that air pockets are avoided (FIG. 2b).

A fillet 2 is placed on either side of the chamber 6 with its skin facing outwards (FIG. 2c).

Figures 2D, 2E:
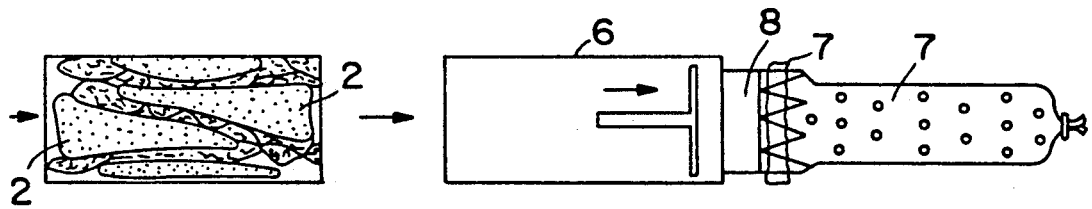

Finally, the small fillets are covered by two fillets with skin 2 which are arranged in such a way that the two fish face the ends of the chamber 6 without overlapping, after which the chamber 6 is closed (FIG. 2d). The six fillets with skin weigh 1.5 kg.

Figure 2F:
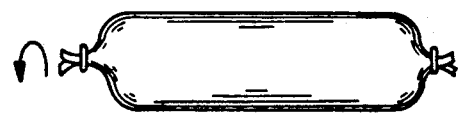

A perforated, 90 mm diameter viscose casing 7 precut to a length of 0.9 m is immersed in cold water, making sure that the interior of the casing is well moistened; one of its ends having been closed by the manufacturer or by a tension clip (not shown), the other end is fitted onto the retractable nozzle 8 of the chamber 6, the fillets are pushed in so that they are situated inside the casing 7 (FIG. 2e) and the turned-back end of the casing is closed by means of the tension clip. This machine stretches the casing, compresses it with removal of water and closes its open end. The sausage is shown in FIG. 2f.

The sausages joined end-to-end are then placed on the shelves of a trolley and deep-frozen in a chamber at −30° C.

EXAMPLE 2

Cleaned whole raw cod are headed, the fillets 2 are removed keeping the skin 3 and are then trimmed manually by making a V cut which eliminates the large side bones and leaves the front part of the sides intact, as shown in FIG. 1b, but with the skin. The fillets with skin represent 43% of the total weight of the fillets.

Skinless fillets 5 are prepared by heading, filleting and skinning cleaned, raw whole cod, after which the backbones are removed by a V cut which leaves the front part of the sides intact; they represent 57% of the total weight of the fillets.

Figure 3A:
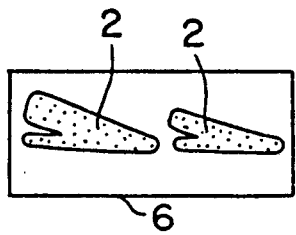
FIG. 3 diagrammatically illustrates the positioning of the fillets in a variant of the process of the present invention.

Two fillets with skin 2 are then placed at the bottom of the moulding chamber of a filling machine with the skin facing outwards in the same way as in Example 1, except that the two fillets face the same end of the chamber, as shown in FIG. 3a.

Figure 3B:
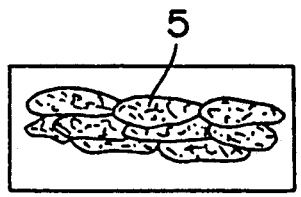
Figure 3C:
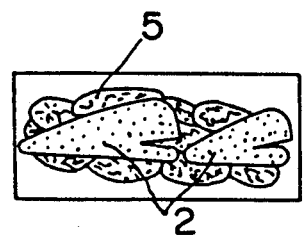

Skinless fillets 5 are injected by means of a volumetric chamber pump into the central part of the moulding chamber 6 (FIG. 3b). The skinless fillets 5 are then covered with two fillets with skin 2 arranged with the skin facing outwards, the two fillets facing that end of the chamber opposite the end faced by the fillets with skin placed at the bottom of the chamber (FIG. 3c).

The 90 mm diameter casings cut to 0.8 m and closed at one end, which have been rehydrated for 20 minutes in water at 50° C., are then filled by applying the end of the casing turned back by 50 mm to the retractable nozzle of the filling machine under a pressure of 3 bar, after which the casing is clipped at its open end. Finally, the sausages are deep-frozen flat in a deep-freezing tunnel. The core temperature of −18° C. is reached in approximately 2 hours and 30 minutes After freezing, the sausages have an average diameter of 93 mm and an average length of 470 mm.

EXAMPLE 3

By means of a cutting tool, two longitudinal and diametrically opposite cuts are made in the casing of the sausage, after which the frozen sausage is immersed for 30 seconds in water at 50° C. The casing is then removed by pulling at its ends and the fish loaf is released.

Figure 4:
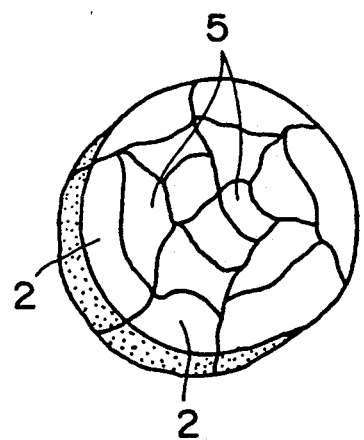
FIG. 4 illustrates a reformed fish steak made in accordance with the present invention.

By means of a saw, the fish loaf is cut laterally into 15.5 mm thick slices. Steaks with skin but no bones, as shown in FIG. 4, are obtained in this way.

75 g butter sauce are introduced into rectangular bags of an air-tight plastics material sealed on three sides through a small side, after which a 100 g steak surface-glazed beforehand by spraying of cold water onto the frozen steak is placed in the bag, the bags are closed in vacuo and stored at −20° C.

For preparation, the bags are placed in boiling water until cooked. The steaks hold together perfectly. They have a natural appearance but no backbone.

We claim:

1. A frozen reformed fish product in the form of a sausage comprising a plurality of compressed raw boneless fish fillets with skin which encompass a plurality of raw boneless fish fillets without skin such that the skin of the fillets with skin forms substantially all of the exterior surface of the product.

2. A reformed fish product according to claim 1 wherein the fillets are selected from the group consisting of cod fillets, salmon fillets, codfish fillets and haddock fillets.

3. A reformed fish product according to claim 1 which is sliced into steaks.

4. A reformed fish product according to claim 3 wherein the steaks are surface glazed with water.

5. A reformed fish product according to claim 4 wherein the steaks are wrapped in air tight bags.

6. A reformed fish product according to claim 5 wherein the air tight bags also contain a sauce for the steaks.

* * * * *